United States Patent
Kawada

[11] Patent Number: 5,845,725
[45] Date of Patent: Dec. 8, 1998

[54] SYSTEM FOR CONTROLLING UNMANNED VEHICLES AT INTERSECTIONS

[75] Inventor: Hiroyuki Kawada, Takahama, Japan

[73] Assignee: Bishamon Industries Corporation, Ontario, Calif.

[21] Appl. No.: 575,859

[22] Filed: Dec. 20, 1995

[30] Foreign Application Priority Data

Jan. 9, 1995 [JP] Japan ................................. 7-001529

[51] Int. Cl.$^6$ ................................................ G08G 1/00
[52] U.S. Cl. ........................... 180/167; 180/168; 340/902
[58] Field of Search ..................... 180/167, 168, 180/169; 340/901, 902, 903, 905, 917, 933; 364/460, 461; 318/587

[56] References Cited

U.S. PATENT DOCUMENTS

| | | | |
|---|---|---|---|
| 5,029,294 | 7/1991 | Kim ........................................ | 180/168 |
| 5,244,055 | 9/1993 | Shimizu ................................. | 180/168 |
| 5,289,181 | 2/1994 | Watanabe et al. ..................... | 340/902 |
| 5,448,219 | 9/1995 | Yoshikawa et al. .................... | 340/917 |

FOREIGN PATENT DOCUMENTS

| | | |
|---|---|---|
| 62-33611 | 7/1987 | Japan . |
| 196908 | 8/1988 | Japan ................................. 180/169 |
| 1130208 | 5/1989 | Japan . |
| 267707 | 10/1989 | Japan ................................. 180/167 |
| 90210 | 3/1990 | Japan ................................. 180/168 |
| 206808 | 8/1990 | Japan ................................. 180/168 |
| 3131910 | 6/1991 | Japan . |

*Primary Examiner*—Brian L. Johnson
*Assistant Examiner*—Min Yu
*Attorney, Agent, or Firm*—Antonio R. Durando

[57] ABSTRACT

A transportation system has several guide strips for unmanned vehicles. The guide strips define an intersection, and a mark warning of the intersection is disposed adjacent each guide strip before the intersection. Each of the vehicles has a detector for the respective mark, a signal transmitter, a receiver for signals coming from the other vehicles, and a timer for measuring a timed interval shorter than the time required to travel from the respective mark to the intersection. The transmitters and timers begin to operate in response to detection of the respective marks. After a selected vehicle passes the respective mark, its receiver attempts to pick up signals from the other vehicles. If no other vehicles are detected before the selected vehicle reaches the intersection, the selected vehicle passes through the intersection without stopping. On the other hand, should the selected vehicle detect another vehicle before the respective timed interval ends, the selected vehicle comes to a halt upstream of the intersection, and stops transmitting, when the timed interval is up. The selected vehicle remains stationary for a predetermined stopping interval following which it begins to move and transmit again if it no longer detects another vehicle. To prevent collisions at the intersection, the timed intervals and stopping intervals differ from vehicle to vehicle.

15 Claims, 5 Drawing Sheets

SYSTEM FOR CONTROLLING UNMANNED VEHICLES AT INTERSECTIONS

BACKGROUND OF THE INVENTION

1. Field of the Invention

The invention relates to unmanned vehicles.

2. Description of the Prior Art

In order to prevent the collision of unmanned vehicles at intersections, the Japanese Patent Publication No. 33611 (1987) provides for the first vehicle arriving at an intersection to generate an electrical signal. At the same time, the reception of electrical signals by the vehicle is blocked. An unmanned vehicle arriving at the intersection subsequently receives the electrical signal transmitted by the first vehicle and is thereby caused to stop upstream of the intersection. The second vehicle proceeds once the first vehicle has passed through the intersection.

The procedure of the Japanese Patent Publication No. 33611 presents a problem when two unmanned vehicles arrive at an intersection at the same time. Since signal transmission by the two vehicles occurs simultaneously and, depending upon the circumstances, each vehicle may either receive or be prevented from receiving the signal transmitted by the other, both vehicles may stop upstream of the intersection or may attempt to pass through the intersection together.

The Japanese Provisional Patent Publication No. 130208 (1989) discloses a system in which unmanned vehicles approaching an intersection are controlled by an optical transmission device at the intersection. A vehicle arriving at the intersection later than another is prevented from passing through the intersection by the optical transmission device.

The system of the Japanese Provisional Patent Publication No. 130208 has the drawback that optical transmission devices are expensive and require additional installation work. Hence, the cost of the system is relatively high.

According to the Japanese Provisional Patent Publication No. 131910 (1991), an unmanned vehicle is equipped with an optical sensor which serves to detect other unmanned vehicles. At the intersection, a priority is assigned to the path of travel of each vehicle. When an unmanned vehicle detects another vehicle of higher priority, the vehicle of lower priority stops upstream of the intersection.

Since the vehicles in the system of the Japanese Provisional Patent Publication No. 131910 always pass through an intersection in an order established by a predetermined set of priorities, the flexibility of the system is somewhat inhibited. Moreover, depending upon the direction of travel of a vehicle and the angle at which it approaches an intersection, the optical sensor of the vehicle may be unable to detect other vehicles approaching the intersection. Also, optical sensors are affected by bright ambient light such as sunshine which can reduce the sensitivity of an optical sensor.

SUMMARY OF THE INVENTION

It is an object of the invention to provide a method which allows unmanned vehicles to pass through intersections safely using relatively simple sensors.

Another object of the invention is to provide a method which enables unmanned vehicles to navigate intersections safely employing relatively inexpensive sensors.

An additional object of the invention is to provide a system which permits unmanned vehicles to traverse intersections safely using relatively simple sensors.

A further object of the invention is to provide a system which makes it possible for unmanned vehicles to pass through intersections safely employing relatively low-cost sensors.

The preceding objects, as well as others which will become apparent as the description proceeds, are achieved by the invention.

One aspect of the invention resides in a method of operating unmanned vehicles. The method comprises the steps of conveying the vehicles along respective paths towards an intersection constituting part of a predetermined area, and warning the vehicles of the intersection at respective predetermined locations upstream of the predetermined area. For each vehicle, the method further comprises the step of sensing, during at least one timed interval following arrival at the respective location, for another of the vehicles. The timed intervals differ from vehicle to vehicle. The method additionally comprises the steps of passing through the intersection any of the vehicles which, while upstream of the predetermined area, fails to detect another of the vehicles, and stopping a first one of the vehicles upstream of the predetermined area when the respective timed interval ends while the first vehicle is upstream of the predetermined area and detects a second one of the vehicles.

According to the invention, a vehicle approaching an intersection attempts to sense other vehicles during at least one timed interval and, if such interval ends while the vehicle is upstream of the intersection and detects a second vehicle, the first vehicle stops upstream of the intersection. Since the timed intervals differ for the various vehicles, a collision at the intersection can be avoided even when more than one vehicle approaches the intersection at one time. Inasmuch as each vehicle is equipped to sense other vehicles, collision avoidance can be accomplished using a relatively simple and economical sensing arrangement.

The warning steps may involve detecting the respective predetermined locations, e.g., by sensing warning elements or marks located along the paths of travel of the vehicles.

The method can additionally comprise stopping a third one of the vehicles upstream of the predetermined area. The stopping step for each of the first and third vehicles may be performed for a predetermined interval, and the predetermined intervals for the two vehicles may differ.

The method may also comprise transmitting a signal, preferably an electrical signal, from each of the vehicles during the respective timed interval. For every vehicle, the step of sensing for another vehicle can then include sensing for the signals transmitted by the other vehicle. The transmitting step for each vehicle can be initiated in response to detection of the respective predetermined location and may be interrupted when the vehicle stops.

Another aspect of the invention resides in a transportation system. The system comprises a plurality of guides defining respective paths, and the paths define an intersection constituting part of a predetermined area. The system further comprises unmanned vehicles which are movable along respective ones of the guides, and warning means for warning the vehicles of the intersection at respective predetermined locations spaced from the predetermined area. Each of the vehicles includes a sensor for the warning means, a signal transmitter, a receiver for signals coming from another of the vehicles, and a timer for measuring at least one timed interval following arrival at the respective predetermined location. The timed intervals differ from vehicle to vehicle, and the receivers are operative during the respective timed intervals. Each of the vehicles is programmed to stop for a predetermined interval when the respective timed interval ends while the vehicle is upstream of the predetermined area and detects another of the vehicles.

Additional features and advantages of the invention will be forthcoming from the following detailed description of preferred embodiments when read in conjunction with the accompanying drawings.

DESCRIPTION OF THE PREFERRED EMBODIMENTS

Figure 1:
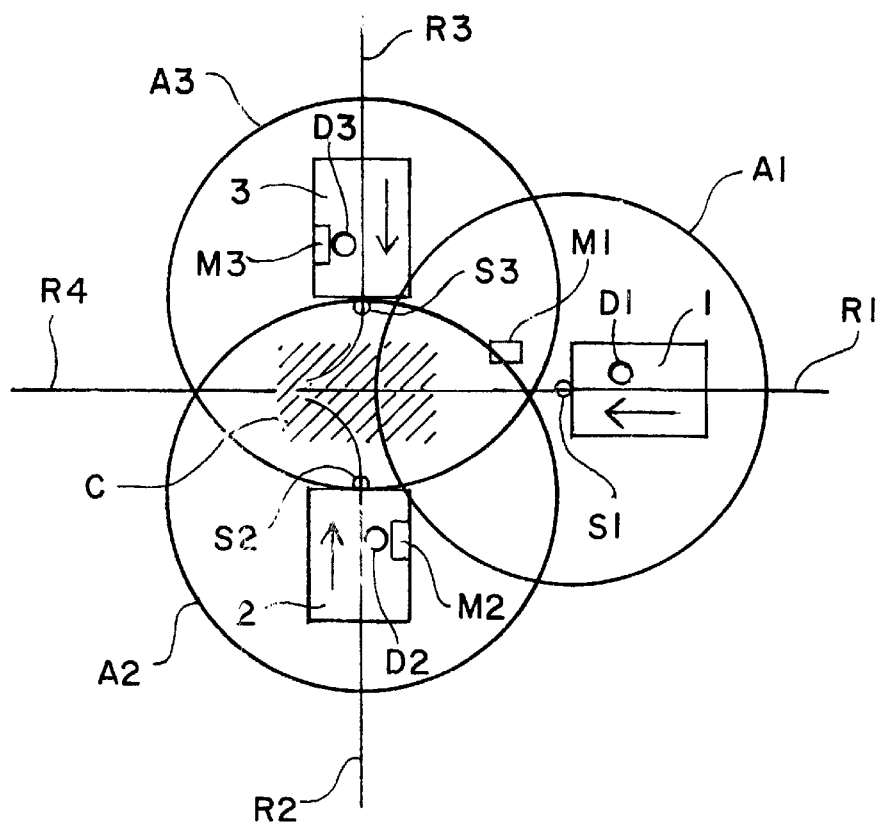
FIG. 1 shows three unmanned vehicles approaching an intersection in a transportation system according to the invention.

FIG. 1 illustrates a transportation system in accordance with the invention. The transportation system comprises unmanned vehicles 1, 2 and 3 which travel along guide strips or tracks R1, R2 and R3. The guide strips R1,R2,R3 form an intersection with a guide strip R4, and the intersection is located within a predetermined rectangular or square area C indicated by hatching. For convenience, the area C and the intersection are considered to be synonymous in the following description.

The vehicles 1,2,3 are approaching the intersection C as indicated by the arrows. Marks or warning elements M1, M2 and M3 are located along the guide strips R1,R2,R3 upstream of the intersection C and serve to warn the vehicles 1,2,3 that they are about to enter the intersection C. The vehicles 1,2,3 are equipped with sensors or detectors D1 D2 and D3 for detecting the marks M1,M2,M3. The speed of travel of the vehicles 1,2,3 is reduced in response to detection of the marks M1,M2,M3 and increases after the vehicles 1,2,3 have passed through the intersection C.

The vehicles 1,2,3 are further equipped with sensing units S1, S2 and S3. Each of the sensing units S1,S2,S3 is designed to transmit weak electrical signals and to receive the electrical signals generated by the other sensing units S1,S2,S3. The sensing units S1,S2,S3 allow the vehicles 1,2,3 to detect one another. The sensing units S1,S2,S3 can transmit in and receive from all directions of the compass, and the sensing units S1,S2,S3 have ranges indicated by the circles A1, A2 and A3.

The marks M1,M2,M3 are assigned priorities with the mark M1 having the highest and the mark M3 the lowest priority. Accordingly, when the vehicles 1,2,3 detect the marks M1,M2,M3 simultaneously, the vehicle 1 passes through the intersection C first, the vehicle 2 passes through the intersection C next and the vehicle 3 passes through the intersection C last. On the other hand, once one of the vehicles 1,2,3 has entered the intersection C, such vehicle continues through the intersection C even if it should sense another of the vehicles 1,2,3.

Figure 2:
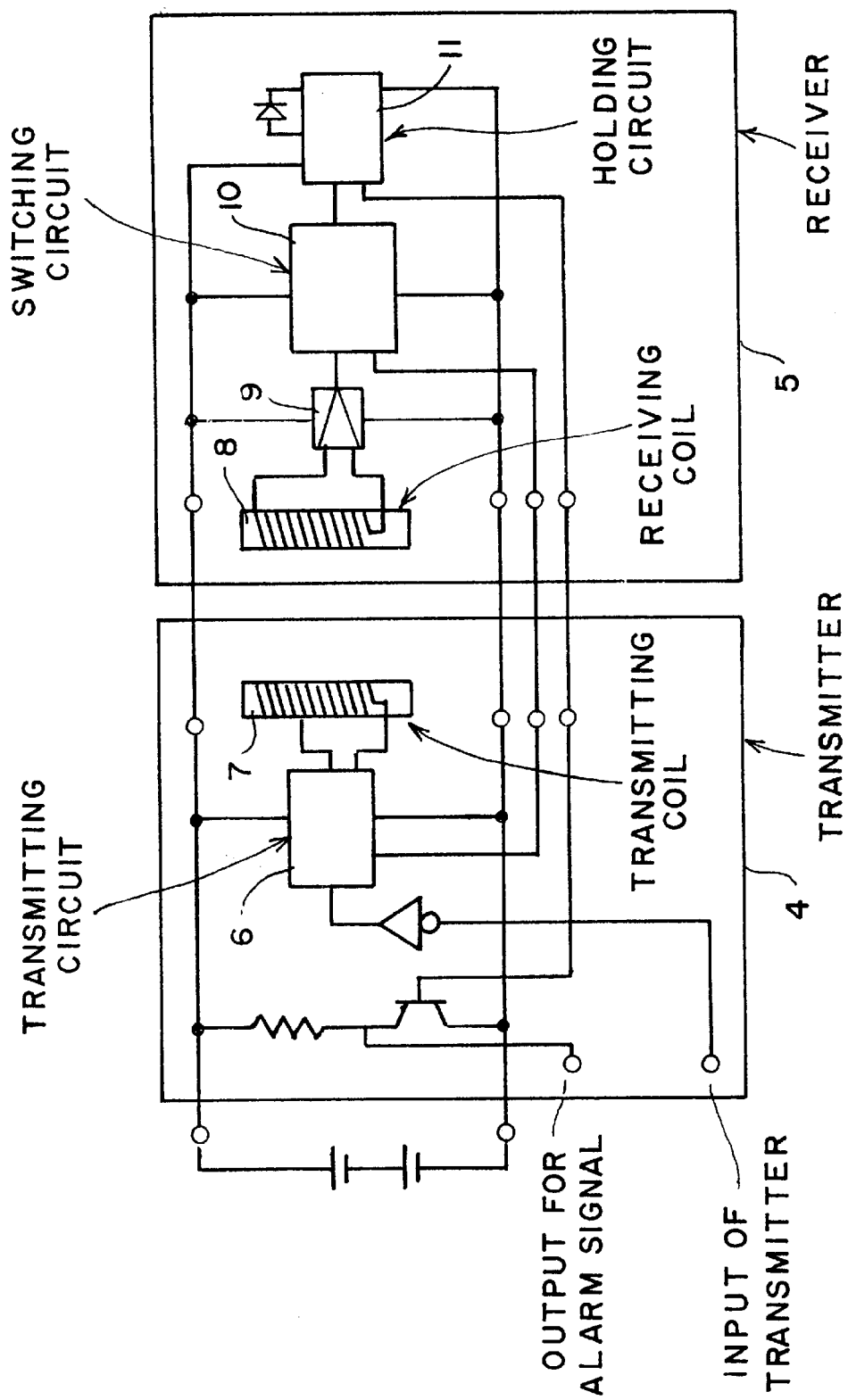
FIG. 2 is a circuit diagram of a sensing unit which is mounted on each of the vehicles of FIG. 1 and includes a transmitter and a receiver.

The sensing units S1,S2,S3 are identical, and the structure of the sensing units S1,S2,S3 is shown in FIG. 2 and will be described using the sensing unit S1 as an example.

The sensing unit S1 includes a transmitter 4 which generates and transmits weak electrical signals, and a receiver 5 which can receive electrical signals from the sensing units S2,S3. The sensing unit S1 is provided with an input for the transmitter 4 and an output for an alarm signal. An alarm signal is generated when the sensing unit S1 receives an electrical signal from either or both of the sensing units S2,S3.

The transmitter 4 comprises a transmitting circuit 6 and a transmitting coil 7. The receiver 5, on the other hand, includes a receiving coil 8, an amplifier 9, a switching circuit 10 and a holding circuit 11. The switching circuit 10 regulates the intervals during which signals can be received while the holding circuit 11 functions to store incoming signals.

The sensing unit S1 is further provided with a control terminal for activating and deactivating the transmitter 4, and a non-illustrated sensitivity regulator for adjusting the sensitivity of the receiver 5. The sensitivity regulator is capable of aligning the receiving range of the receiver 5 with the sensing units S2,S3.

The input for the transmitter 4 can be switched on and off. When the input is off, the sensing unit S1 can receive signals but cannot transmit. In the on position of the input, the sensing unit S1 is able to receive as well as transmit.

Figure 3:
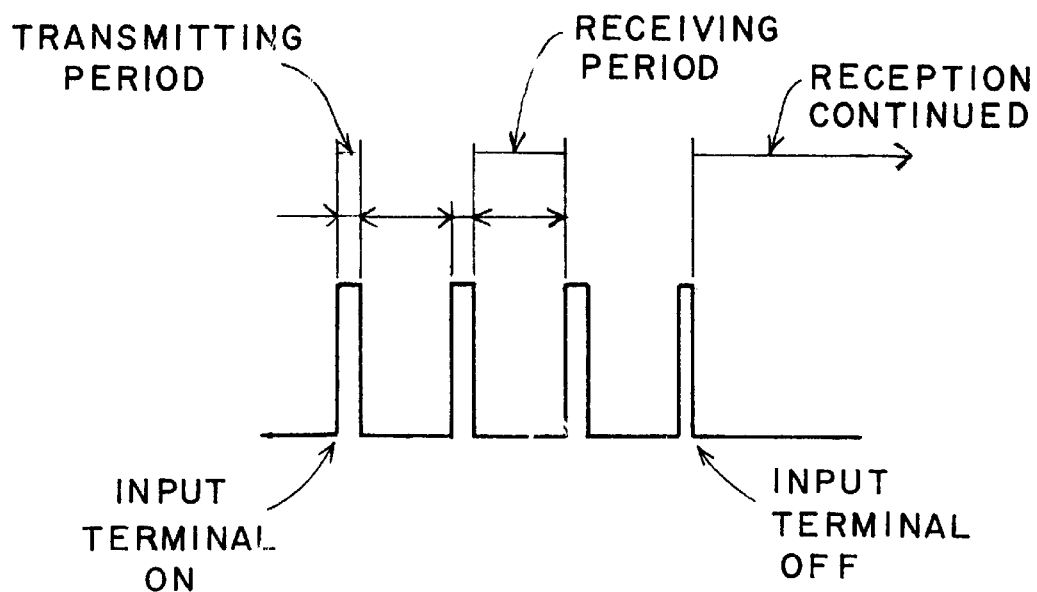
FIG. 3 illustrates a transmitting and receiving pattern for the sensing unit of FIG. 2.

As illustrated in FIG. 3, transmission and reception take place alternately when the input for the transmitter 4 is on. Thus, the sensing unit S1 transmits for a certain period, e.g., 3 milliseconds, to advise the vehicles 2,3 of the presence of the vehicle 1. During the transmitting period, the receiver 5 is inoperative and the sensing unit S1 is unable to receive signals from the sensing units S2,S3. Following the transmitting period, the transmitter 4 stops transmitting and the receiver 5 becomes operative for a certain period, e.g., 12 milliseconds. If the receiver 5 picks up signals from the sensing unit S2 and/or the sensing unit S3 during the receiving period, the sensing unit S1 generates an alarm signal. The sensing unit S1 continues to alternately transmit and receive as long as the input for the transmitter 4 is on. When the input is switched off, the sensing unit S1 no longer transmits although it can still receive.

The sensing units S2,S3 can also have the transmitting and receiving pattern illustrated in FIG. 3. The lengths of the transmitting periods can be the same for all of the sensing units S1,S2,S3 and the lengths of the receiving periods can likewise be the same. However, in such an event, the transmitting and receiving pattern for each of the sensing units S1,S2,S3 constantly shifts in time so as to prevent the transmitting and receiving patterns for any two of the sensing units S1,S2,S3 from coinciding. Should the transmitting and receiving patterns of two or more of the sensing units S1,S2,S3 coincide at a particular instant, this condition will last only momentarily thereby avoiding problems in reception.

Considering the situation depicted in FIG. 1, the vehicles 2,3 have detected the marks M2,M3 and thereby recognize that they are approaching the intersection C. The sensing unit S2 is within the range A3 of the sensing unit S3 and, similarly, the sensing unit S3 is within the range A2 of the sensing unit S2. The sensing units S2,S3 therefore generate an alarm signal.

Since the sensing units S1,S2,S3 have circular ranges A1,A2,A3, each of the vehicles 1,2,3 can detect the others regardless of the directions in which the vehicles 1,2,3 approach the intersection C and regardless of the angles between the vehicles 1,2,3. Furthermore, inasmuch as each of the vehicles 1,2,3 can detect the others via the sensing units S1,S2,S3 which are installed on the vehicles 1,2,3, the only components of the collision avoidance arrangement which must be floor-mounted are the marks M1,M2,M3. Consequently, the collision avoidance arrangement can employ simple and low-cost components.

The sensing units S1,S2,S3 normally do not transmit and begin doing so in response to detection of the marks M1,M2, M3.

Figure 4A:
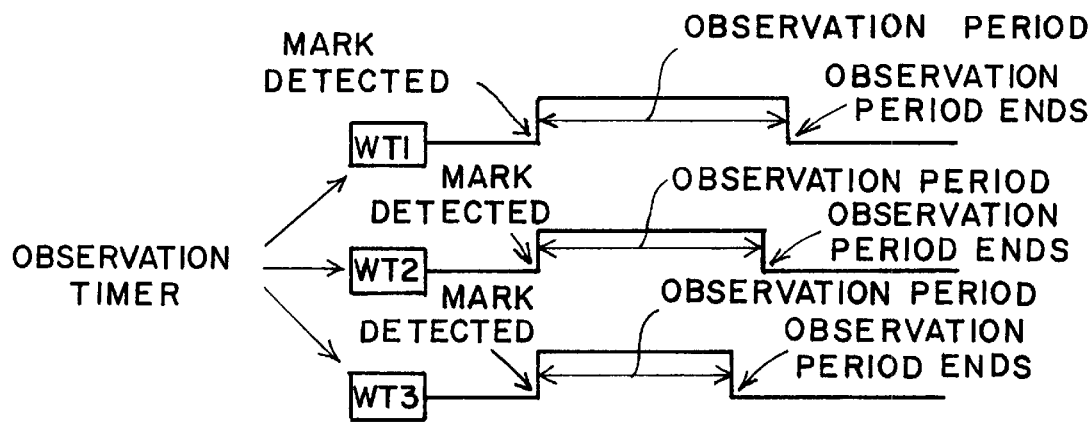
FIG. 4 shows the operating intervals of various timers which control the vehicles of FIG. 1.

With reference to FIG. 4*a*, the vehicles 1,2,3 are equipped with observation timers WT1, WT2 and WT3. The timers WT1,WT2,WT3, which commence timing in response to detection of the marks M1,M2,M3, establish timed periods or intervals W1, W2 and W3 of different length. It is here assumed that the timed period W1 is the longest and the timed period W3 is the shortest. Each of the timed periods W1,W2,W3 constitutes an observation period or interval during which the respective sensing unit S1,S2,S3 senses for signals from the other sensing units. If a sensing unit S1,S2,S3 detects a signal from another sensing unit during the respective observation period W1,W2,W3, the respective vehicle 1,2,3 continues moving until the observation period W1,W2,W3 ends. Should the sensing unit S1,S2,S3 still receive the signal at the end of the observation period W1,W2,W3, the vehicle 1,2,3 thereupon comes to a halt and simultaneously stops transmitting. If no signal is detected during an observation period W1,W2,W3, the respective vehicle 1,2,3 travels to and through the intersection C.

Assuming that the circular ranges A1,A2,A3 of the sensing units S1,S2,S3 have the same size and that the vehicles 1,2,3 detect the marks M1,M2,M3 at the same time, the vehicles 1,2,3 detect one another, and the observation timers WT1,WT2,WT3 commence timing, simultaneously. Inasmuch as the observation period W3 of the vehicle 3 is shorter than the observation periods W1,W2 of the vehicles 1,2, the vehicle 3 comes to a halt and stops transmitting at the end of the observation period W3 because, at such time, the vehicle 3 receives the signals from the vehicles 1,2. Similarly, the vehicle 2 stops and no longer transmits at the end of the observation period W2 since the vehicle 2 detects the signal from the vehicle 1. However, the vehicle 1 continues moving at the end of the observation period W1 because no signals are received from the vehicles 2,3.

Taking into account the sizes of the circular ranges A1,A2,A3 of the sensing units S1,S2,S3, the lengths of the observation periods W1,W2,W3 preferably differ in such a way that the vehicles 1,2,3 always stop in the same order.

Figure 4B:
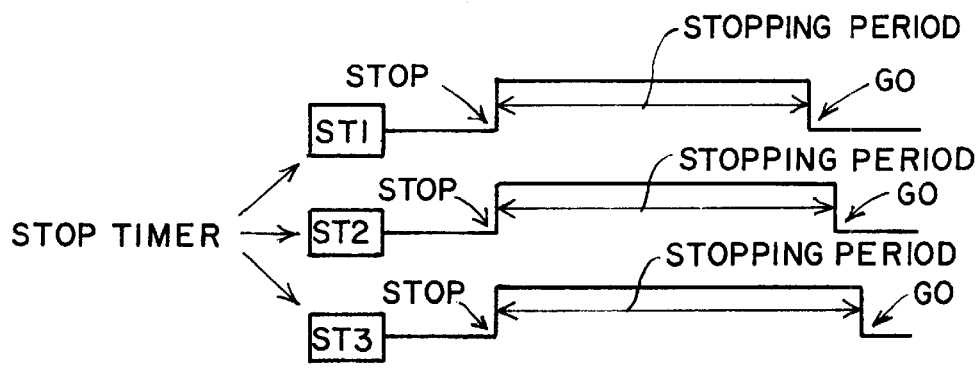

Turning to FIG. 4*b*, the vehicles 1,2,3 are provided with stop timers ST1,ST2,ST3. Each of the stop timers ST1,ST2, ST3 regulates the time for which the respective vehicle 1,2,3 remains stopped when it comes to a halt following detection of another vehicle at the end of the respective observation period W1,W2,W3. The stopping period or interval for each of the vehicles 1,2,3 is selected based on the time which is required for the other vehicles to travel completely through the intersection C. Moreover, in order to establish an order of departure should two or more of the vehicles 1,2,3 come to a halt adjacent the intersection C simultaneously, the stopping periods for the vehicles 1,2,3 have different lengths. It is here assumed that the stopping period for the vehicle 3 is the longest and that for the vehicle 1 the shortest. Hence, if the vehicles 1,2,3 come to a stop at the same time, the vehicle 1 leaves first and the vehicle 3 last.

Figure 4C:
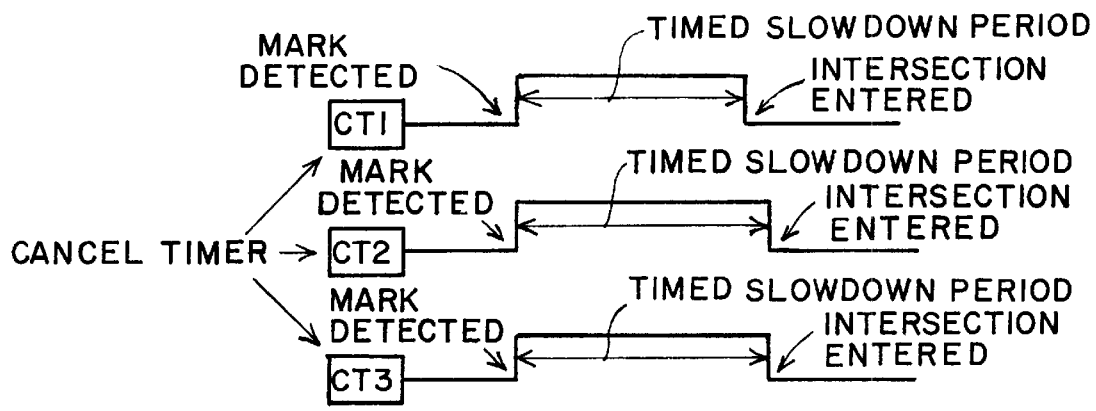

Considering FIG. 4*c*, the vehicles 1,2,3 are additionally equipped with cancel timers CT1,CT2,CT3. As mentioned earlier, the vehicles 1,2,3 slow down when the marks M1,M2,M3 are detected. The cancel timers CT1,CT2,CT3 are activated in response to detection of the marks M1,M2, M3 and function as distance measuring devices. Thus, each of the cancel timers CT1,CT2,CT3 is set for a period or interval equal to the time required for the respective vehicle 1,2,3 to travel from the mark M1,M2,M3 to the intersection C.

These timed slowdown periods or intervals are calculated from the distances, and the speeds of the vehicles 1,2,3, between the marks M1,M2,M3 and the intersection C. When the cancel timers CT1,CT2,CT3 shut off, the vehicles 1,2,3 are in the intersection C.

In FIG. 1, the marks M2,M3 are equidistant from the intersection C whereas the mark M1 is nearer the intersection C than are the marks M2,M3. Accordingly, if the vehicles 1,2,3 travel at the same speed between the marks M1,M2,M3 and the intersection C, the timed slowdown periods for the vehicles 2,3 are equal and exceed the timed slowdown period for the vehicle 1.

It was pointed out previously that a stop command is issued when one of the vehicles 1,2,3 detects another at the end of the respective observation period W1,W2,W3. To prevent obstruction of the intersection C, the stop command is cancelled or overridden when detection takes place after the cancel timer CT1,CT2,CT3 has shut off and the vehicle 1,2,3 proceeds through the intersection C.

Additional marks for detection by the vehicles 1,2,3 can be placed at the locations where the vehicles 1,2,3 enter the intersection C. The cancel timers CT1,CT2,CT3 may then be eliminated.

Figure 5:
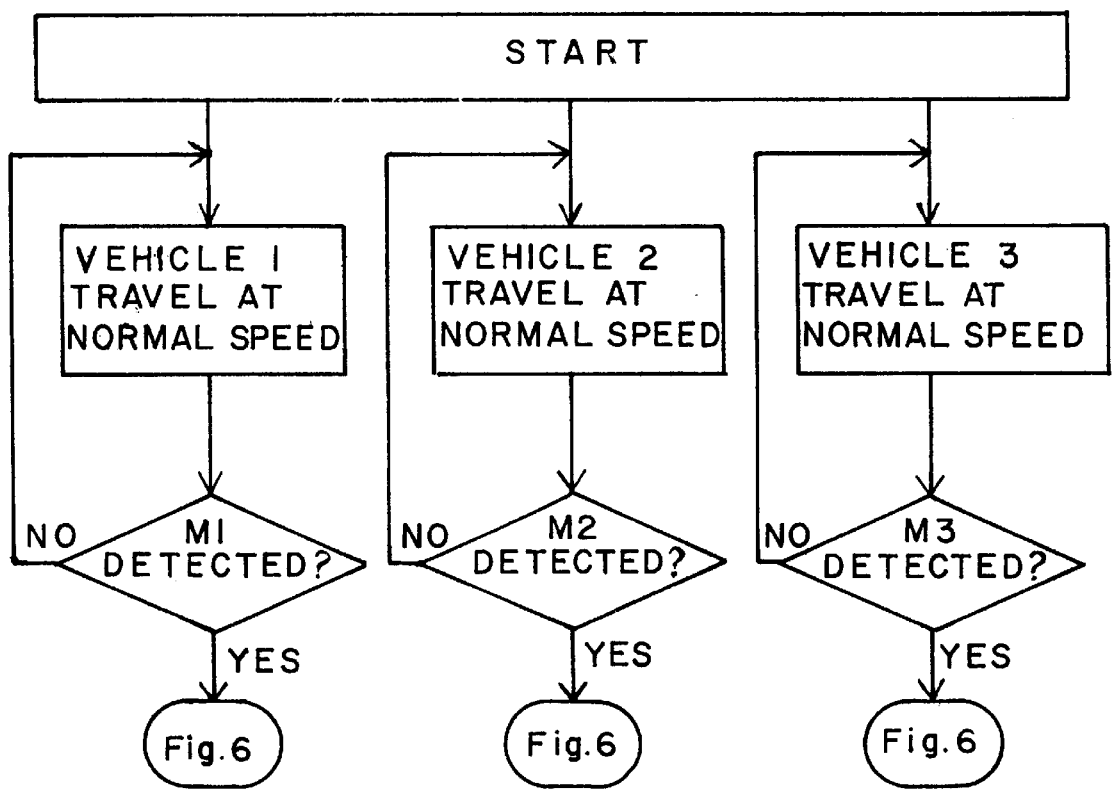
FIG. 5 is a flow chart illustrating the operation of the vehicles of FIG. 1 as the vehicles approach respective warning marks upstream of the intersection.

FIG. 5 is a flow chart showing the operation of the transportation system when the system is started up and the vehicles 1,2,3 are upstream of the marks M1,M2,M3. The vehicles 1,2,3 travel along the guide strips R1,R2,R3 at a constant, relatively high speed which is the normal speed of the vehicles 1,2,3 in the absence of obstructions and intersections. While the vehicles 1,2,3 travel, the vehicles 1,2,3 sense for the marks M1,M2,M3. As long as the vehicles 1,2,3 fail to detect the marks M1,M2,M3, the vehicles 1,2,3 continue to advance at their normal speed. When the vehicles 1,2,3 detect the marks M1,M2,M3, the vehicles 1,2,3 revert to the mode of operation depicted by the flow chart of FIG. 6.

Figure 6:
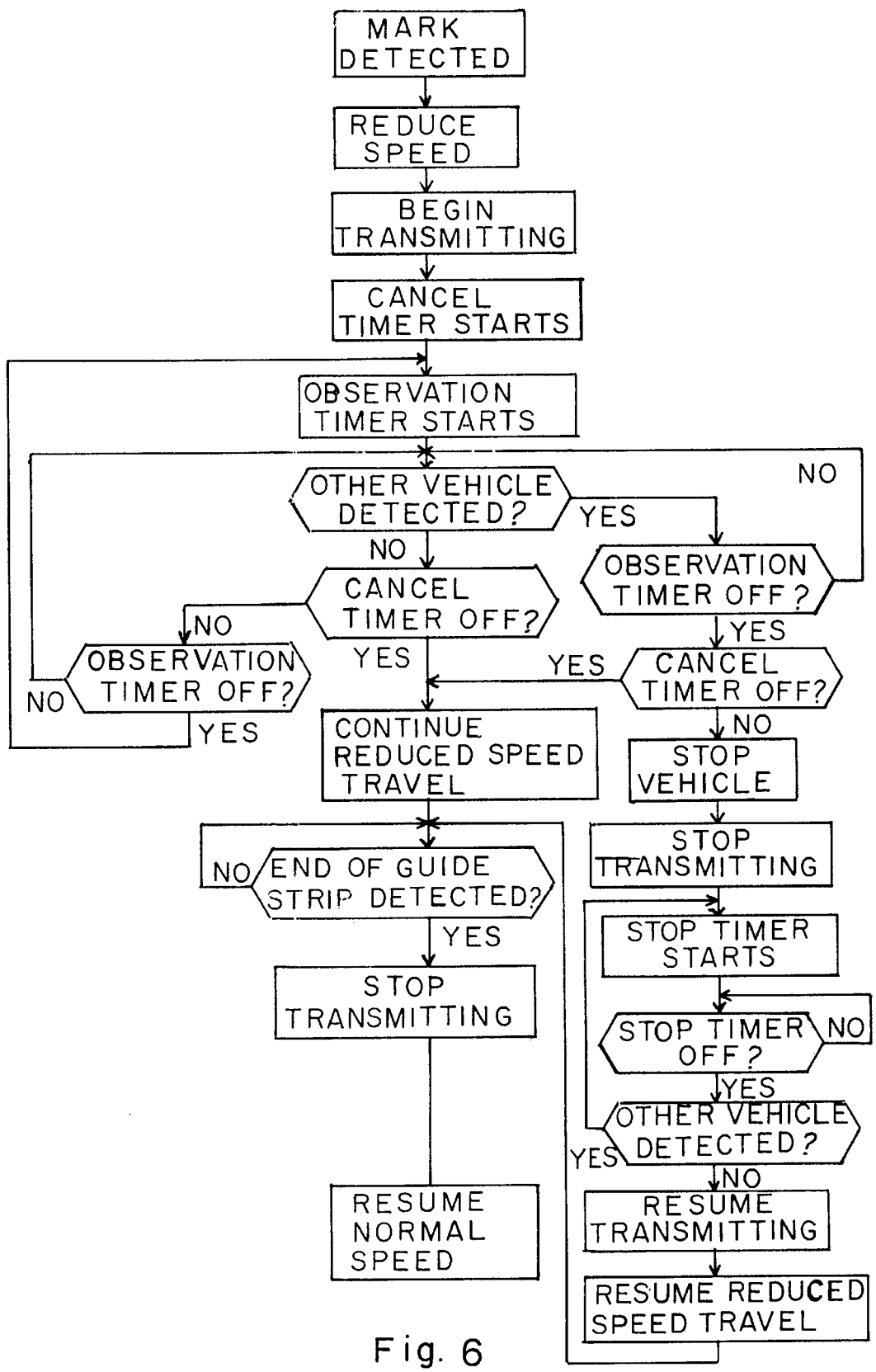
FIG. 6 is a flow chart showing the operation of the vehicles following detection of the respective marks.

The mode of operation of the vehicles 1,2,3 following detection of the marks M1,M2,M3 will be described with reference to FIG. 6 using the vehicle 1 as an example.

Upon detecting the mark M1, the speed of the vehicle 1 is reduced. The sensing unit S1 starts transmitting while the cancel timer CT1 and the observation timer WT1 begin timing. As the vehicle 1 travels at its reduced speed, a determination is made as to whether or not another of the vehicles 2,3 has been detected.

Should neither of the vehicles 2,3 be detected, a determination is made as to whether or not the cancel timer CT1 has shut off, i.e., as to whether or not the vehicle 1 has entered the intersection C. If no, the observation timer WT1 is checked to see whether it has shut off. Should the observation timer WT1 be running, the vehicle 1 continues moving at its reduced speed while sensing for the vehicles 2,3. The same is true if the observation timer WT1 has shut off except that the observation timer WT1 is reset.

If neither of the vehicles 2,3 has been detected and the cancel timer CT1 shuts off, the vehicle 1 continues through the intersection C at its reduced speed even if one of the vehicles 2,3 is now detected. Once the vehicle 1 detects the end of the guide strip R1, the sensing unit S1 stops transmitting and the vehicle 1 accelerates to its normal speed.

Should one of the vehicles 2,3 be detected, a determination is made as to whether or not the observation timer WT1 has shut off. If no, the vehicle 1 continues moving at its reduced speed while sensing for the vehicles 2,3. On the other hand, should the observation timer WT1 have shut off, the cancel timer CT1 is checked to see whether it has stopped running. If yes, the vehicle 1 has already entered the intersection C and continues through the latter at its reduced speed. As before, when the vehicle 1 detects the end of the guide strip R1, the sensing unit S1 stops transmitting and the vehicle 1 resumes travel at its normal speed. Due to the fact that the vehicle 1 does not stop once it has entered the intersection C, the vehicle 1 never blocks the intersection C.

If one of the vehicles 2,3 has been detected and the observation timer WT1 has shut off while the cancel timer CT1 is still running, i.e., while the vehicle 1 is upstream of the intersection C, the vehicle 1 stops upstream of the intersection C. When the vehicle 1 comes to a halt, the sensing unit S1 stops transmitting and the stop timer ST1 begins timing. As long as the stop timer ST1 runs, the vehicle 1 stays where it is. When the stop timer ST1 shuts off, the vehicle 1 remains stationary while a determination is made as to whether or not the vehicle 1 still senses one of the vehicles 2,3. If yes, the vehicle 1 remains in place and the stop timer ST1 is reset. If not, the sensing unit S1 begins to transmit again and the vehicle 1 starts to move at its reduced speed once more. The vehicle 1 passes through the intersection C and, upon detecting the end of the guide strip R1, accelerates to its normal speed while the sensing unit S1 stops transmitting.

Even if two or more of the vehicles 1,2,3 come to a halt at the same time, the vehicles 1,2,3 can traverse the intersection C without colliding. This stems from the fact that the stopping periods of the vehicles 1,2,3 differ so that the vehicles 1,2,3 begin to move again at different times.

Inasmuch as each of the vehicles 1,2,3 is equipped with a sensing unit S1,S2,S3 for detection of the other vehicles while the only floor-mounted components of the collision avoidance arrangement are the marks M1,M2,M3, the collision avoidance arrangement can employ simple and low-cost components. Moreover, since each of the sensing units S1,S2,S3 has a circular range with the respective sensing unit S1,S2,S3 situated at the center, the vehicles 1,2,3 can detect one another with a high degree of reliability regardless of the angles between the vehicles 1,2,3 and the directions from which the vehicles 1,2,3 approach the intersection C. Additionally, even if two or more of the vehicles 1,2,3 approach the intersection C and detect each other simultaneously, the vehicles 1,2,3 can pass through the intersection C without collision because the observation periods, as well as the stopping periods, for the vehicles 1,2,3 differ. Thus, the vehicles 1,2,3 come to a stop in a predetermined order and begin to move again at different times. Furthermore, due to the fact that a vehicle 1,2,3 does not stop once it has entered the intersection C despite detection of another of the vehicles 1,2,3, blocking of the intersection C by the vehicles 1,2,3 is avoided.

In summary, the invention provides a transportation system in which unmanned vehicles can detect one another very reliably using simple and economical components. The system allows the vehicles to pass through an intersection automatically in a smooth and safe fashion.

Various modifications are possible within the meaning and range of equivalence of the appended claims.

I claim:

1. A method of operating unmanned vehicles comprising the steps of:

conveying said vehicles along respective paths towards an intersection constituting part of a predetermined area;

warning said vehicles of said intersection at respective locations upstream of said area;

sensing by each of said vehicles, during at least one timed interval following arrival at the respective location, for another of said vehicles, said timed intervals differing from vehicle to vehicle;

passing through said intersection any of said vehicles which, while upstream of said area, fails to detect another of said vehicles; and stopping a first one of said vehicles upstream of said area when the respective timed interval ends while said first vehicle is upstream of said area and detects a second one of said vehicles.

2. The method of claim 1, wherein the warning steps comprise detecting the respective locations.

3. The method of claim 1, further comprising stopping a third one of said vehicles upstream of said area, the stopping step for each of said first and third vehicles being performed for a predetermined interval, and said predetermined intervals differing.

4. The method of claim 1, further comprising transmitting a signal from each of said vehicles during the respective timed interval, the sensing step for each of said vehicles including sensing for the signals transmitted by another of said vehicles.

5. The method of claim 4, wherein the warning steps comprise detecting, and the transmitting steps are performed in response to detection of, the respective locations.

6. The method of claim 4, wherein the transmitting step for said first vehicle is interrupted in response to the stopping step.

7. The method of claim 4, wherein said signals are electrical.

8. A transportation system comprising:

a plurality of guides defining respective paths, said paths defining an intersection which constitutes part of a predetermined area;

a plurality of unmanned vehicles movable along respective ones of said guides; and warning means for warning said vehicles of said intersection when said vehicles are at respective locations spaced from said area, each of said vehicles including a sensor for said warning means, a signal transmitter, a receiver for signals coming from another of said vehicles, and a timer for measuring at least one timed interval following arrival at the respective location, said timed intervals differing from vehicle to vehicle, and said receivers being operative during the respective timed intervals, each of said vehicles being programmed to stop for a predetermined interval when the respective timed interval ends while the vehicle is upstream of said area and detects another of said vehicles.

9. The system of claim 8, wherein said warning means comprises a warning element along each of said guides at the respective location.

10. The system of claim 8, wherein said timers are activated in response to detection of said warning means.

11. The system of claim 8, wherein said predetermined intervals differ.

12. The system of claim 8, wherein said transmitters are operative during the respective timed intervals.

13. The system of claim 12, wherein said transmitters are activated in response to detection of said warning means.

14. The system of claim 12, wherein said transmitters are deactivated in response to stopping of the respective vehicles.

15. The system of claim 8, wherein said transmitters are designed to transmit electrical signals.

* * * * *